(12) United States Patent
Jeong

(10) Patent No.: US 7,546,694 B1
(45) Date of Patent: Jun. 16, 2009

(54) COMBINATION DRAWING/MEASURING PEN

(76) Inventor: Il Poom Jeong, 151 E. Pallisades Ave., #E9, Englewood, NJ (US) 07631

( * ) Notice: Subject to any disclaimer, the term of this patent is extended or adjusted under 35 U.S.C. 154(b) by 0 days.

(21) Appl. No.: 12/061,903

(22) Filed: Apr. 3, 2008

(51) Int. Cl.
*G01B 3/12* (2006.01)
(52) U.S. Cl. ............................. 33/775; 401/194
(58) Field of Classification Search ................ 33/775, 33/772, 773, 779, 780; 401/194, 795, 192, 401/52
See application file for complete search history.

(56) References Cited

U.S. PATENT DOCUMENTS

| | | | | |
|---|---|---|---|---|
| 3,120,924 A | * | 2/1964 | Van De Mark | 401/195 |
| 4,768,040 A | * | 8/1988 | Pipkin et al. | 401/195 |
| 5,117,684 A | * | 6/1992 | Hwang | 116/34 R |
| 5,433,014 A | * | 7/1995 | Falk et al. | 33/763 |
| 5,485,682 A | * | 1/1996 | Le Breton | 33/773 |
| 5,560,119 A | * | 10/1996 | LeBreton | 33/773 |
| D399,146 S | * | 10/1998 | Le Breton | D10/70 |
| 5,995,123 A | * | 11/1999 | McCormick | 401/195 |
| 6,412,187 B1 | * | 7/2002 | Sasaki et al. | 33/784 |
| 6,742,953 B2 | * | 6/2004 | Burden et al. | 401/194 |
| 7,172,358 B1 | * | 2/2007 | Rudelius et al. | 401/195 |
| 2006/0028459 A1 | * | 2/2006 | Underwood et al. | 345/179 |
| 2008/0129711 A1 | * | 6/2008 | Bergstrom et al. | 345/179 |
| 2008/0191021 A1 | * | 8/2008 | Lapstun et al. | 235/454 |

FOREIGN PATENT DOCUMENTS

| | | | | |
|---|---|---|---|---|
| JP | 54114950 A | * | 9/1979 | |
| JP | 60036901 A | * | 2/1985 | |
| JP | 20030150304 A | * | 5/2003 | |

* cited by examiner

*Primary Examiner*—Yaritza Guadalupe-McCall

(57) ABSTRACT

A combination drawing/measuring pen constructed of an elongated, hollow body portion having a cavity therein, an aperture at a front end and an on/off switch at a rear end; a pen having a roller ball tip in the cavity operatively moving up and down by a first button protruding outside the cavity such that the roller ball tip may extend through the aperture for drawing; a sensor probe in the cavity operatively moving up and down by a second probe outside the cavity such that the sensor probe may extend through the aperture for measuring; a central processing unit (CPU) for calculating an output from the sensor probe; a LCD panel on the body portion for displaying a measurement from the sensor probe; and at least one battery in the cavity for powering the CPU and the LCD panel.

7 Claims, 3 Drawing Sheets

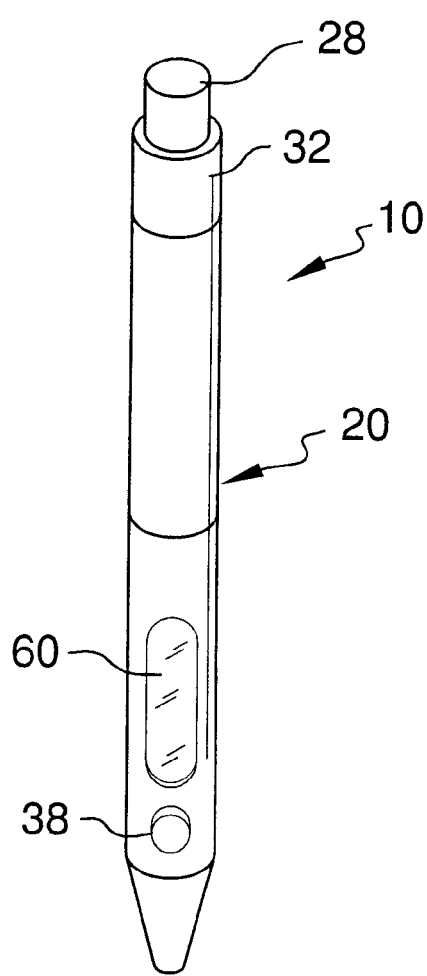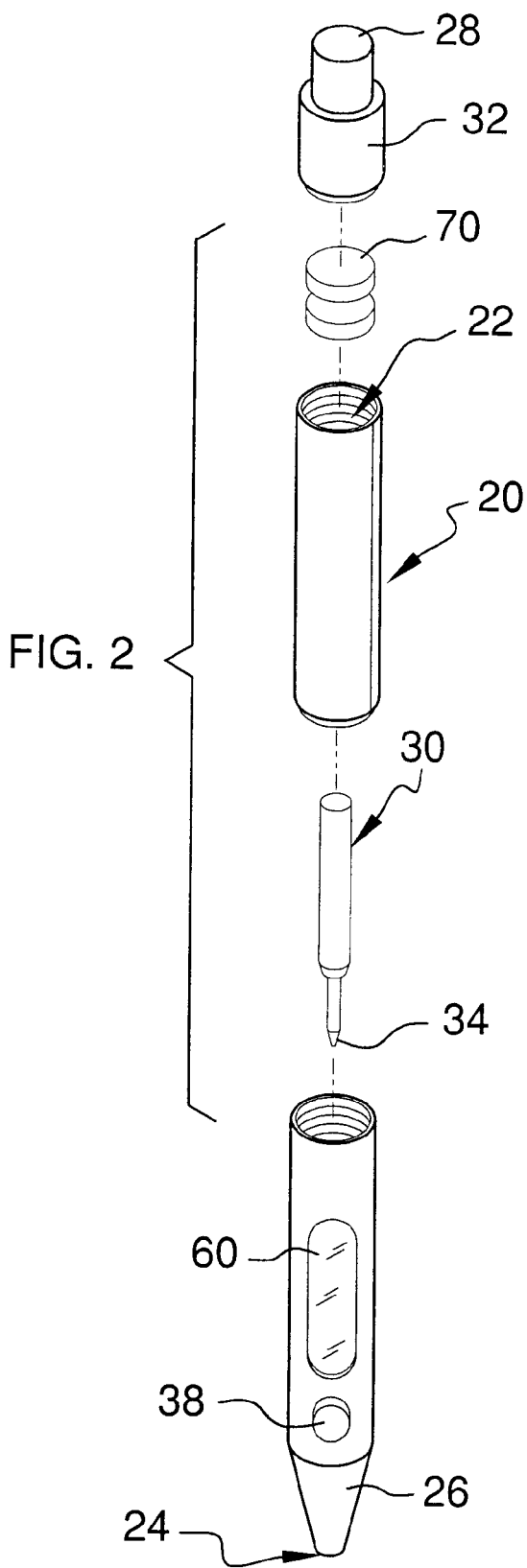

COMBINATION DRAWING/MEASURING PEN

FIELD OF THE INVENTION

The present invention generally relates to a stationary item and more particularly, relates to a combination drawing and measuring pen that can be used not only for writing, drawing, but also for scaling and measuring digitally.

BACKGROUND OF THE INVENTION

Drafting and drawing pens have been widely used by professionals and amateurs alike for many years. With the recent advent in electronics, measuring or scaling can also be done by a pen-like instrument where a distance or an area can be measured and then fed into a computer for calculation. For a professional or amateur draftsman, both instruments are used frequently and therefore it would be desirable that the two instruments can be combined into a single unit such that it can be conveniently carried and used.

It is therefore an object of the present invention to provide a drafting/drawing pen that can also do measuring and scaling.

It is another object of the present invention to provide a combination drawing/measuring pen that can be conveniently carried and used by a drafting professional or amateur.

SUMMARY OF THE INVENTION

In accordance with the present invention, a combination drawing/measuring pen that can be used not only to draw but also to perform digital measurement is provided.

In a preferred embodiment, the present invention combination drawings/measuring pen is constructed of an elongated, hollow body portion having a cavity therein, an aperture at a front end and an on/off switch at a rear end; a pen having a roller ball tip in the cavity operatively moving up and down by a first button protruding outside the cavity such that the roller ball tip may extend through the aperture for drawing; a sensor probe in the cavity operatively moving up and down by a second probe outside the cavity such that the sensor probe may extend through the aperture for measuring; a central processing unit (CPU) for calculating an output from the sensor probe; a LCD panel on the body portion for displaying a measurement from the sensor probe; and at least one battery in the cavity for powering the CPU and the LCD panel.

BRIEF DESCRIPTION OF THE DRAWINGS

The invention will now be described, by way of example, with reference to the accompanying drawings, in which:

FIG. 1 is a perspective view of the present invention combination drawing/measuring pen.

FIG. 2 is a perspective view of the present invention combination drawing/measuring pen in a disassembled state.

DETAILED DESCRIPTION OF THE PREFERRED EMBODIMENT

Figure 3:
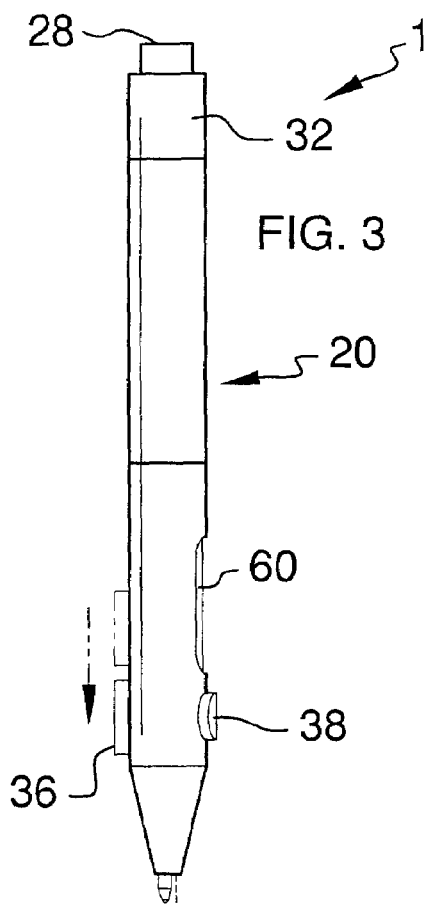
FIG. 3 is a side view of the present invention combination drawing/measuring pen.

The present invention discloses a combination drawing/measuring pen that can be used not only for drafting, drawing and also for measuring and scaling digitally.

The present invention combination drafting/drawing pen and electronic scale measuring device functions as both a drawing/writing instrument and a scaled measuring instrument. The device has the look and feel of a writing or drawing instrument with the exception of having a slightly larger diameter for the main body to accommodate the unit electronics and associated electromechanical components. The present invention has a roller ball tip that serves as the ink dispenser for drawing or writing, and is also suitable for encoding sensor to detect rotation and provide a means of distance recording as well. The drawing/measuring pen can function in two modes of simultaneous operation. When functioning as a drawing instrument the present invention measures the distance traversed on the paper while making a given line, arc, or another complex marking form. By selecting an appropriate dimension scale, the drawing/measuring pen calculates the scaled distance and indicates it on a small display screen built into the pen body. A user can then create a precise line or another marking without the need for a scale ruler or other measuring instrument. The combination drawing/measuring pen is operated with button-cell sized batteries similar to those used in electronic hearing aids and also has replaceable ink cartridges. A time-limited auto-power off feature can also be considered to conserve battery power. The memory capabilities stores several or many scale measurements and many of those can be recalled and viewed on the display screen.

The present invention combination drawing/measuring pen fulfills the need for a combination measuring/drawing aid for various potential users in the technical design occupation. The appealing features of the present invention are its ability to use the roller tip as both an ink dispenser and a rotary encoder for an electronic distance measuring purpose. The present invention can be used to convert the measured roller distances into scale dimensions and can then be displayed.

Referring initially to FIG. 1, wherein a present invention combination drawing/measuring pen 10 is shown in a perspective view. The combination drawing/measuring pen 10 is constructed of an elongated, hollow body portion 20 that has a cavity 22 therein, an aperture 24 at a front end 26 and an on/off switch 28, of the push button type, at a rear end 32. A pen 30 that has a roller ball tip 34 in the cavity 22 operatively moving up and down by a first button 36, shown in FIG. 3, protruding outside the cavity 22 such that the roller ball tip 34 may extend through the aperture 24 for drawing.

Figure 4:
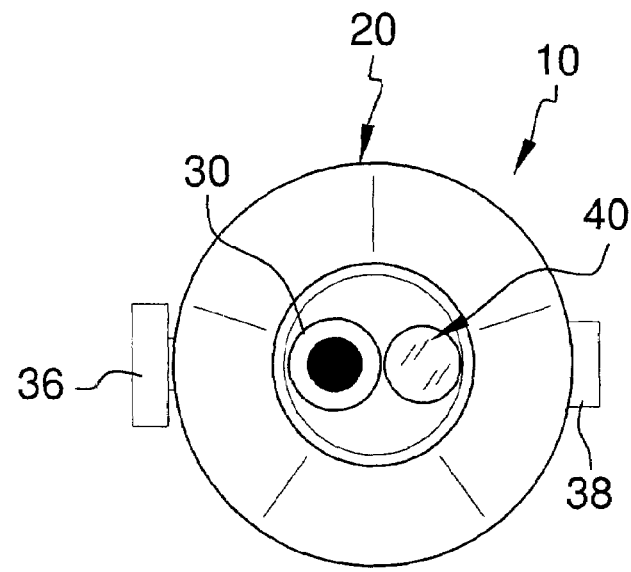
FIG. 4 is a cross-sectional view taken laterally of the present invention combination drawing/measuring pen.
Figure 7:
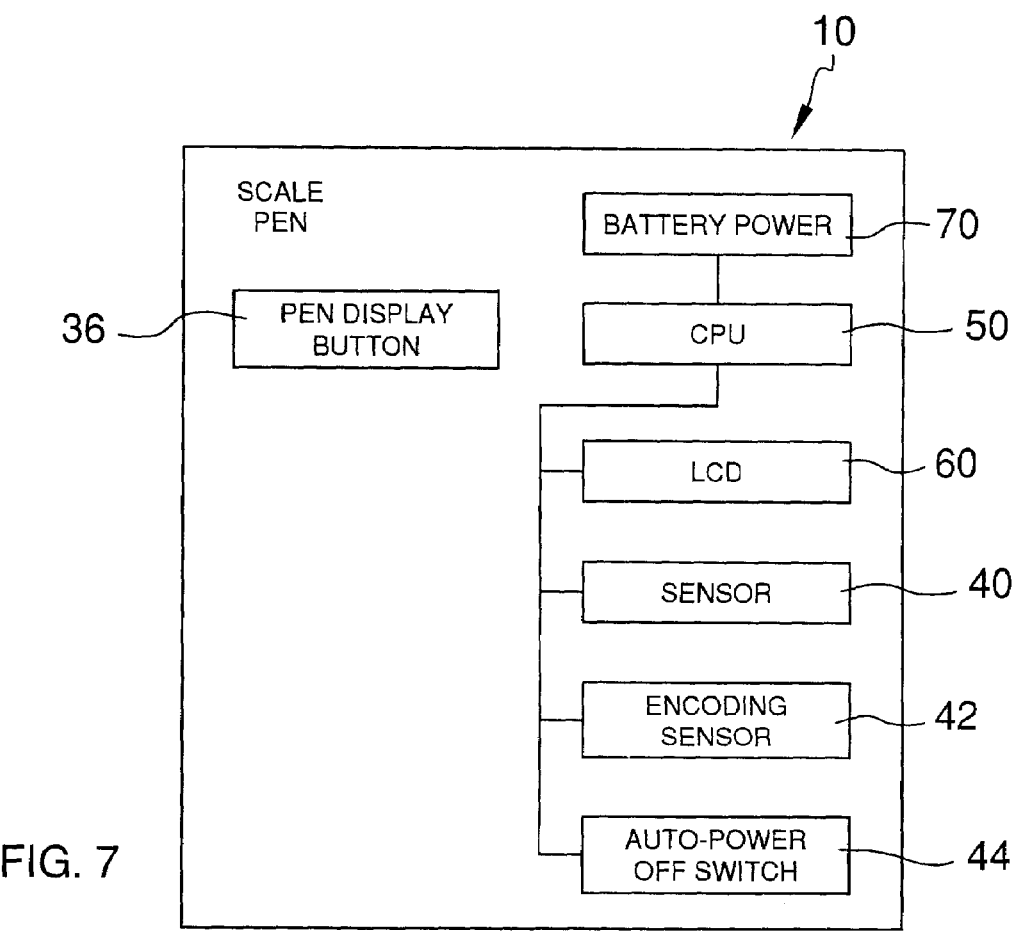
FIG. 7 is a functional block diagram for the present invention combination pen.

A sensor probe 40, shown in FIG. 4, is also provided in cavity 22 operatively moving up and down by a second button 38, shown in FIG. 3, protruding outside the cavity 22 such that the sensor probe 40 may extend through the aperture 24 for measuring. A central processing unit (CPU) 50, shown in FIG. 7, is further provided in the cavity 22 for calculating output from the sensor probe 40.

Figure 5:
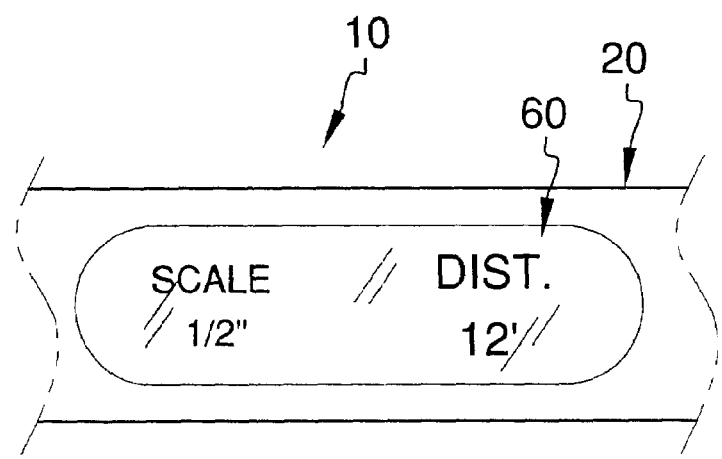
FIG. 5 is a partial, enlarged view of the LCD panel of the present invention combination drawing/measuring pen.

The present invention combination drawing/measuring pen 10 further includes a LCD panel 60 which, as shown in FIG. 5, may illustrate a distance measured and the scale is measured for easy viewing by the user. The CPU 50 and the LCD panel 60 are powered by at least one battery 70 located in the cavity 22.

Figure 6:
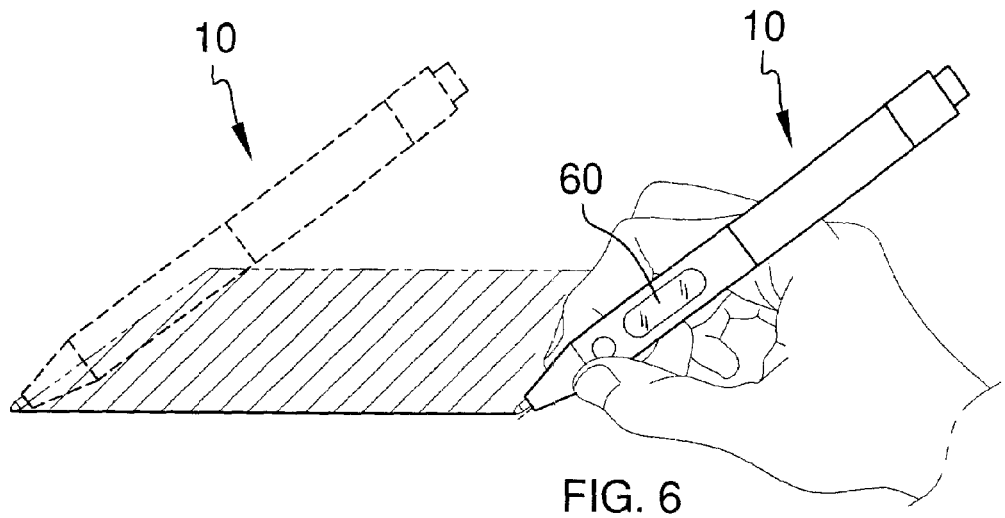
FIG. 6 is an illustration of how the present invention combination pen is utilized.

FIG. 6 is an illustration showing how the present invention combination pen 10 is utilized. FIG. 7 is a functional block diagram illustrating the various functions and components of the present invention combination pen 10. An encoding sensor 42 that functions in junction with the sensor 40 and an auto-power off switch 44, used to conserve battery power, are also provided in the present invention combination pen 10.

The present invention combination drawing/measuring pen has therefore been amply described in the above descriptions and in the appended drawings of FIGS. 1-7.

While the preferred embodiments of the invention have been described above, it will be recognized and understood that various modifications can be made in the invention and the appended claims are intended to cover all such modifications which may fall within the spirit and scope of the invention.

What is claimed is:

1. A combination drawing/measuring pen comprising:
   an elongated, hollow body portion having a cavity therein, an aperture at a front end and an on/off switch at a rear end;
   a pen having a roller ball tip in said cavity operatively moving up and down by a first button protruding outside said cavity such that said roller ball tip may extend through said aperture for drawing;
   a sensor probe in said cavity operatively moving up and down by a second button outside said cavity such that said sensor probe may extend through said aperture for measuring;
   a central processing unit (CPU) for calculating an output from said sensor probe;
   a LCD panel on said body portion for displaying a measurement from said sensor probe; and
   at least one battery in said cavity for powering said CPU and said LCD panel.

2. The combination drawing/measuring pen according to claim 1, wherein said at least one battery is a rechargeable battery pack.

3. The combination drawing/measuring pen according to claim 1 further comprising an encoding sensor that functions in conjunction with the measuring sensor for sensing data to the CPU.

4. The combination drawing/measuring pen according to claim 1, wherein said LCD panel displays both a distance measured and the scale utilized.

5. The combination drawing/measuring pen according to claim 1, wherein said LCD panel is a monochrome display panel.

6. The combination drawing/measuring pen according to claim 1, wherein said sensor probe can be used to measure both a linear distance, a curved distance, and an area encircled by a line.

7. The combination drawing/measuring pen according to claim 1, wherein said on/off switch of the push button type.

* * * * *